United States Patent Office 3,605,498
Patented Sept. 20, 1971

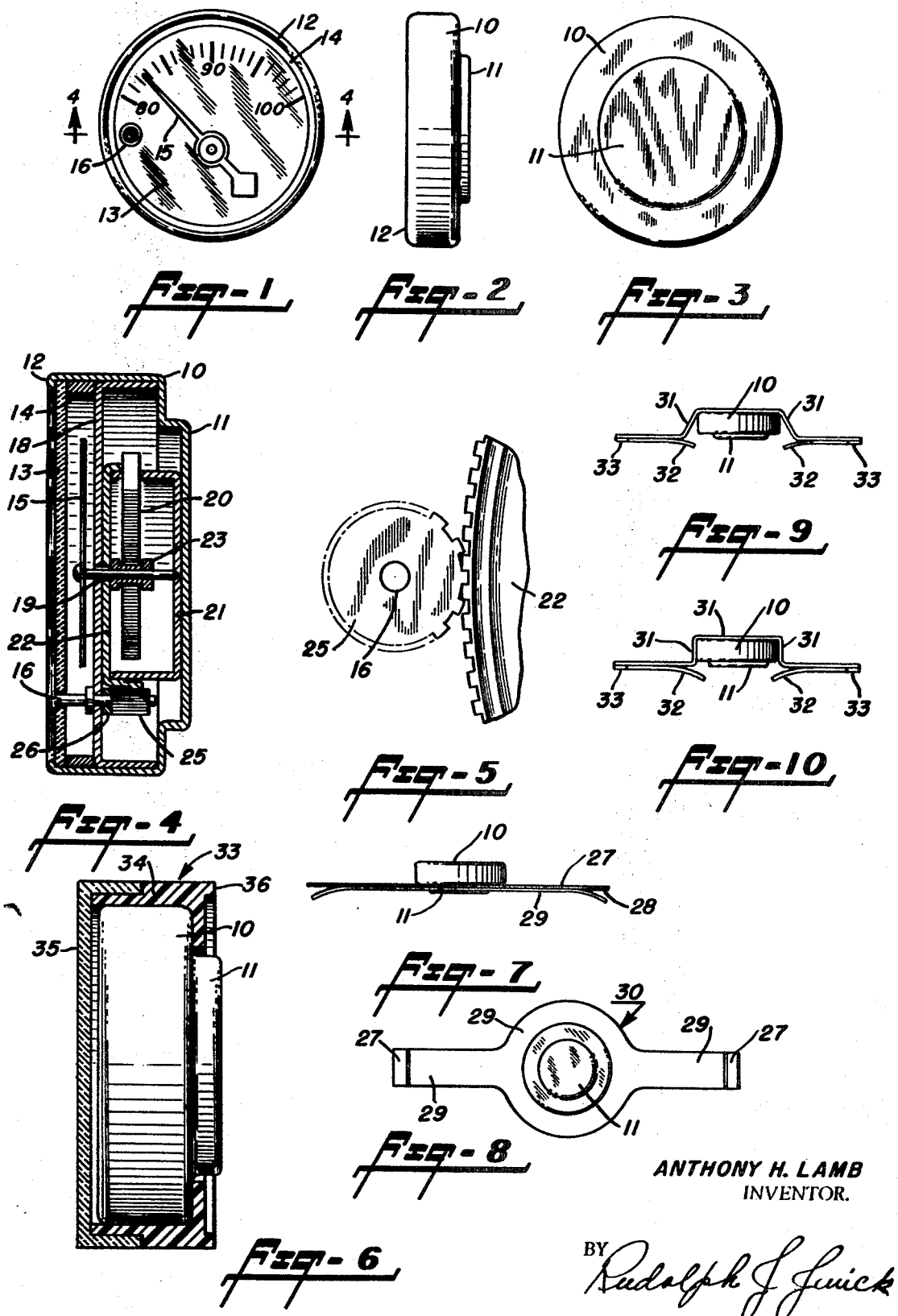

3,605,498
THERMOMETER FOR MEASURING SKIN
TEMPERATURE
Anthony H. Lamb, 66 King St., Hillside, N.J. 07205
Filed July 18, 1969, Ser. No. 842,866
Int. Cl. G01k 5/62
U.S. Cl. 73—363.7
3 Claims

ABSTRACT OF THE DISCLOSURE

A bi-metallic thermometer particularly adapted for the measurement of the temperature of a selected area of the skin. The thermometer is affixed to the skin and the position of the pointer is adjusted relative to the scale by a screw-pinion arrangement while the thermometer is so affixed.

BACKGROUND OF THE INVENTION

It is known that a difference in skin temperature between opposite, similar areas of the body may be taken as an indication of the presence of disease located in the area having the higher or lower than normal temperature. Thermography is the term applied to a relatively new diagnostic procedure for locating elevated temperature areas on the body. In this procedure, infrared rays from the body are detected, by a scanning method, and converted to a photograph. Such equipment is large, expensive and not avaliable to the average physician. Similar results, for practical purposes, can be obtained by means of my direct reading thermometers placed on, or attached to, selected areas of the body to be explored, such thermometers being of small size, inexpensive, and easy to read.

Generally, the skin temperature, at an effected area, will vary from 1 to 5° F., above or below normal, depending upon the particular individual, the specific area of the body being investigated and the severity of the disease. Thus, it often is desirable to use two or more identical thermometers for the simultaneous measurement of a plurality of adjacent skin areas, in order to eliminate as many variables as possible. Desirably, then, the thermometers should be of a small size, inexpensive, easy to read, have a fast response, a high accuracy and good precision.

SUMMARY OF THE INVENTION

A bi-metallic thermometer is enclosed within a metal casing, the top of the casing carrying a graduated scale and the bottom of the casing being adapted for flush contact with the skin. A calibrating screw extends into an opening formed in the window of the thermometer and is mechanically-coupled to an inner, metal casing which encloses the bi-metallic coil and is rotatable about the axis of the thermometer pointer. Self-adhesive tape, secured to the thermometer, serves as one means for securing the thermometer in operative position on the skin.

An object of this invention is the provision of a bi-metallic thermometer particularly adapted for the measurement of skin temperature, which thermometer is of inexpensive construction, easy to read, and has a fast response.

An object of this invention is the provision of a skin temperature thermometer having a heat transfer portion for contact with the skin, a pointer adjusting means manually operable from the front of the thermometer, and means for attaching the thermometer in fixed position on the skin.

The above-stated and other objects and advantages of the invention will become apparent from the following description when taken with the accompanying drawings showing several embodiments of the invention. It will be understood, however, that the drawings are for purposes of illustration and are not to be construed as defining the scope or limits of the invention, reference being had for the latter purpose to the claims appended hereto.

BRIEF DESCRIPTION OF THE DRAWINGS

In the drawings wherein like reference characters denote like parts in the several views;

FIGS. 1–3 are, respectively, front, side and rear elevational views of a thermometer made in accordance with one embodiment of the invention;

FIG. 4 is a cross-sectional view taken along the line 4—4 of FIG. 1 and drawn to an enlarged scale;

FIG. 5 is an enlarged, fragmentary rear elevational view showing the arrangement for adjusting the pointer position relative to the scale;

FIG. 6 is a cross-sectional view similar to FIG. 4 and showing the thermometer encased within a plastic housing;

FIG. 7 is a side elevational view showing one arrangement for affixing the thermometer to the skin;

FIG. 8 is a corresponding rear elevational view thereof;

FIG. 9 is a side elevational view showing another arrangement for affixing the thermometer to the skin; and FIG. 10 is a similar view showing still another arrangement for affixing the thermometer to the skin.

DESCRIPTION OF THE PREFERRED EMBODIMENTS

Reference is made to FIGS. 1–3 wherein there is shown the bottom 10 of an outer metal casing having depressed portion 11. The casing rim 12 is drawn over a window 13 spaced from the calibrated scale by a circular bezel 14, which scale is formed on the surface of the outer casing, as will be described below. The position of the pointer 15, relative to the scale, is adjustable by manually rotating the adjusting member, here shown as a screw 16 having a slotted end and aligned with an opening formed in the window.

Referring now to the enlarged, cross-sectional view of FIG. 4, the top 18, of the outer metal casing, carries the scale calibrated in temperature values and is press-fitted into the bottom 10. The window 13 is spaced from the pointer 15 by the bezel 14, said pointer being secured to the staff 19. The bi-metallic coil 20 is enclosed within an inner metal casing comprising a bottom 21 press-fitted into a top 22, the inner convolution of said coil being secured to a bushing 23, which bushing, in turn, is secured to the staff. Axially-extending teeth, rolled into the expanded rim of the casing top 22, are in mesh with a pinion 25 (see also FIG. 5), said pinion being secured to the inner shank portion of the pointer adjusting screw 16. An integral flange on this screw and a spring washer 26 serve to retain the pinion in proper alignment relative to the inner casing. The outer convolution of the bi-metallic coil is offset, radially, and passes through aligned slots formed in the overlapping side walls of the two members forming the inner casing. Thus, rotation of the screw 16 results in a correponding rotation of the inner casing, the bi-metallic coil and the pointer. The screw 16 also provides a stop for the pointer. Preferably the inner and outer casings are made of aluminum, or other suitable material, to provide good heat transfer to the coil.

The described pointer-adjusting arrangement permits the alignment of the pointer with a desired scale mark while the thermometer is affixed in operative position to the skin. It will be apparent that the adjusting screw 16 can be positioned to the right of the pointer staff, thereby to prevent obstruction of the scale by the hand of a right handed person while making an adjustment in the pointer position.

One arrangement for affixing the thermometer in operative position on the skin is shown in FIGS. 7 and 8. Adhesive tape is die cut to the shape as shown in FIG. 8, such tape comprising a strip 27, having a self-adhesive coating 28 on one surface, and a backing strip 29. The central portion of the tape is a ring 30 having an outside diameter substantially equal to that of the thermometer outer casing 10 and an inside diameter somewhat larger than that of the casing rear portion 11. A self-adhesive coating also is applied to the surface of the ring away from the backing strip. The coated surface of the ring is pressed against the thermometer case, thereby causing the tape to adhere to the thermometer. Upon peeling off the backing strip, the self-adhesive strip 27 is pressed onto the skin to secure the thermometer in a desired position.

Another arrangement for affixing the thermometer to the skin is shown in FIG. 9. A clear plastic tape 31, carrying a self-adhesive coating, extends over and is attached to the front of the thermometer. The end portions of the tape carry backing strips 32 which are peeled off when the thermometer is to be affixed to the skin. These backing strips are scored so that upon removal thereof short, non-stick tabs 33 remain to facilitate removal of the tape from the skin upon completion of the temperature measurement. Alternatively, the clear plastic tape may be preformed into a cup-like configuration for receiving the thermometer, as shown in FIG. 10.

The metal encased thermometer shown in FIG. 4 may be inserted into a plastic housing as shown in FIG. 6, said housing comprising a bottom 33 having a reduced-diameter portion 34 receiving a clear plastic cover 35. The plastic bottom 33 includes an integral, outer lip 36 and, also, is provided with a circular opening through which the depressed portion 11, of the metal casing 10, extends. The outer surfaces of the depressed portion 11 and the lip 36 lie in the same plane so that the lip prevents the flow of air currents over the skin area under temperature measurement, thereby minimizing the effect of ambient temperature on the thermometer indication.

In the construction shown in FIGS. 2 and 4 the bottom of the thermometer casing includes a depressed portion 11 for contact with the skin. It will be apparent, however, that the bottom of such casing can be flat, that is, monoplanar.

Having now described the invention what I desire to protect by Letters Patent of the United States is set forth in the following claims:

1. A skin temperature thermometer comprising,
   (a) a metal outer casing member having a top carrying a scale and a window spaced from the scale, said casing having a bottom including an outwardly-depressed portion,
   (b) a metal inner casing member rotatable within the outer casing member,
   (c) a pointer secured to a staff passing through aligned openings formed in the said outer casing member and inner casing member,
   (d) a bi-metallic coil disposed in the inner casing member, said coil having one end secured to the staff and the other end passing through a slot formed in the side wall of the inner casing member,
   (e) a pointer adjusting member carried by the said outer casing member and aligned with an opening formed in the window,
   (f) a pinion secured to the pointer-adjusting member and in mesh with teeth formed on the peripheral surface of the inner casing member, and
   (g) an outer housing comprising a plastic bottom and a clear plastic top, said top overlying the said window, said bottom being provided with an opening through which the depressed portion of the outer casing member extends, and said bottom including an annular lip having an outer surface lying substantially in the plane of the outer surface of the said depressed portion of the outer casing member.

2. The invention as recited in claim 1, in combination with a self-adhesive tape attached to the bottom of the outer casing member with the said depressed portion of such bottom extending through an opening formed in the tape.

3. The invention as recited in claim 1, in combination with a self-adhesive, clear plastic tape pre-formed to include a cup-like portion, which cup-like portion is affixed to the said outer housing.

References Cited
UNITED STATES PATENTS

| | | | |
|---|---|---|---|
| 1,638,276 | 8/1927 | Schultz | 73—363.7 |
| 2,193,851 | 3/1940 | Arden | 73—363.7 |
| 2,440,932 | 4/1948 | Butler | 116—129(A) |
| 3,002,385 | 10/1961 | Wahl et al. | 73—356 |
| 3,338,103 | 8/1967 | Lohrs et al. | 73—431 |
| 3,448,619 | 6/1969 | Howard et al. | 73—363.7 |

FOREIGN PATENTS

| | | | |
|---|---|---|---|
| 1,051,303 | 12/1966 | Great Britain | 73—363.7 |

LOUIS R. PRINCE, Primary Examiner

D. M. YASICH, Assistant Examiner

U.S. Cl. X.R.

73—431